US009072930B2

(12) United States Patent
Ashby et al.

(10) Patent No.: US 9,072,930 B2
(45) Date of Patent: Jul. 7, 2015

(54) SYSTEM AND METHOD FOR MEASURING RUNNING EFFICIENCIES ON A TREADMILL

(71) Applicant: ICON Health & Fitness, Inc., Logan, UT (US)

(72) Inventors: Darren C. Ashby, Richmond, UT (US); Greg W. Law, Smithfield, UT (US)

(73) Assignee: ICON Health & Fitness, Inc., Logan, UT (US)

( * ) Notice: Subject to any disclaimer, the term of this patent is extended or adjusted under 35 U.S.C. 154(b) by 195 days.

(21) Appl. No.: 13/860,217

(22) Filed: Apr. 10, 2013

(65) Prior Publication Data

US 2013/0274066 A1  Oct. 17, 2013

Related U.S. Application Data

(60) Provisional application No. 61/623,059, filed on Apr. 11, 2012.

(51) Int. Cl.
*A63B 24/00* (2006.01)
*A63B 22/02* (2006.01)
*A63B 71/06* (2006.01)

(52) U.S. Cl.
CPC ......... *A63B 24/0087* (2013.01); *A63B 24/0062* (2013.01); *A63B 22/0235* (2013.01); *A63B 71/0622* (2013.01); *A63B 2024/0065* (2013.01); *A63B 2071/063* (2013.01); *A63B 2071/068* (2013.01); *A63B 2220/17* (2013.01); *A63B 2220/51* (2013.01); *A63B 2220/58* (2013.01); *A63B 2220/806* (2013.01)

(58) Field of Classification Search
CPC ....................................................... A63B 24/00
USPC ............................... 482/1–9, 51, 54, 900–902
See application file for complete search history.

(56) References Cited

U.S. PATENT DOCUMENTS

| 7,736,273 B2 | 6/2010 | Cox et al. | |
|---|---|---|---|
| 2007/0032353 A1* | 2/2007 | Wilkins et al. | 482/54 |
| 2011/0098157 A1* | 4/2011 | Whalen et al. | 482/52 |
| 2013/0165297 A1* | 6/2013 | Daly et al. | 482/9 |
| 2014/0221160 A1* | 8/2014 | Hardy et al. | 482/8 |

* cited by examiner

*Primary Examiner* — Glenn Richman
(74) *Attorney, Agent, or Firm* — Holland & Hart LLP

(57) ABSTRACT

A treadmill may comprise a deck, a treadbelt covering at least a portion of the deck, and a drive motor configured for driving the treadbelt. The treadmill may further comprise a sensor, a console, and a computer. The sensor may be configured to detect an amount of power utilized by the drive motor, and the console may be configured to convey information to a user. The computer may comprise a memory and a processor, and be configured for electric communication with the sensor and the consol. The computer may be programmed to analyze data received from the sensor, to provide a communication to a user through the consol that provides information about the user's running form based on the analyzed data received from the sensor, and to provide a communication to the user through the consol that provides information on how the user may change their current running form to improve running efficiency.

7 Claims, 4 Drawing Sheets

SYSTEM AND METHOD FOR MEASURING RUNNING EFFICIENCIES ON A TREADMILL

CROSS-REFERENCE TO RELATED APPLICATIONS

This application claims priority to U.S. Provisional Patent Application No. 61/623,059 filed Apr. 11, 2012.

TECHNICAL FIELD

In general, the present disclosure relates to exercise devices. More specifically, the present disclosure relates to treadmills that include at least one sensor for detecting the energy used by a drive motor of the treadmill and a console for communicating information about the user's running form based on the analyzed data received from the at least one sensor.

BACKGROUND

It is useful for runners, and especially endurance runners, to improve their running efficiency. If a runner can improve their running form to run more efficiently, they can improve running speed and running distance. A runner may attempt to determine their running efficiency by evaluating the way that they feel during or after a run. However, factors other than the runner's form may affect the way that the runner feels. For example, weather conditions, diet, sickness and other factors may affect the way a runner feels. Accordingly, it may be difficult for a runner to get an accurate assessment of how efficiently they are running, or how a change in their running form is affecting their running efficiency.

U.S. Pat. No. 7,736,273 to Cox et al., filed 10 Mar. 2009, incorporated herein in its entirety by this reference, describes an interface box removably disposed on incoming power wiring of a treadmill, and describes utilizing electronic signature analysis (ESA) for gait analysis. However, Cox et al. does not describe how one might determine a running efficiency of a runner with the ESA, or how one might determine interaction forces between the runner and the treadmill with the ESA. Rather, for analyzing a runner's athletic performance, Cox et al. describes that one could establish characteristic 'signatures' of elite runners and compare them with other developing runners.

In view of the foregoing, there is a need for devices and methods that may effectively measure, calculate, and report running efficiency and/or interaction forces. Additionally, there is a need for devices and methods that may facilitate improvement in running efficiency.

SUMMARY

In one aspect of the disclosure, a treadmill comprises a deck, a treadbelt, a drive motor, a console, and a computer.

Another aspect of the disclosure may include any combination of the above-mentioned features and may further include the treadbelt covering at least a portion of the deck.

Another aspect of the disclosure may include any combination of the above-mentioned features and may further include the drive motor being configured for driving the treadbelt.

Another aspect of the disclosure may include any combination of the above-mentioned features and may further include the sensor being configured to detect an amount of power utilized by the drive motor.

Another aspect of the disclosure may include any combination of the above-mentioned features and may further include the console being configured to convey information to a user.

Another aspect of the disclosure may include any combination of the above-mentioned features and may further include the computer comprising a memory and a processor.

Another aspect of the disclosure may include any combination of the above-mentioned features and may further include the computer being configured for electric communication with the sensor and the consol.

Another aspect of the disclosure may include any combination of the above-mentioned features and may further include the computer being programmed to analyze data received from the sensor.

Another aspect of the disclosure may include any combination of the above-mentioned features and may further include the computer being programmed to provide a communication to a user through the console that provides information about the user's running form based on the analyzed data received from the sensor.

Another aspect of the disclosure may include any combination of the above-mentioned features and may further include the computer being programmed to provide a communication to the user through the console that provides information on how the user may change their current running form to improve running efficiency.

Another aspect of the disclosure may include any combination of the above-mentioned features and may further include the computer being programmed to analyze the signal from the sensor to determine a user's running cadence.

In Another aspect of the disclosure may include any combination of the above-mentioned features and may further include the computer being programmed to analyze the signal from the sensor to determine an impact force when a user's foot impacts the treadbelt.

Another aspect of the disclosure may include any combination of the above-mentioned features and may further include the console including a video display.

Another aspect of the disclosure may include any combination of the above-mentioned features and may further include the computer being programmed to deliver a video signal to the console to provide video information to the user via the video display that depicts how the user may change their current running form.

Another aspect of the disclosure may include any combination of the above-mentioned features and may further include the console having a speaker.

Another aspect of the disclosure may include any combination of the above-mentioned features and may further include the computer being programmed to deliver an audio signal to the console to provide audio information to the user via the speaker that describes how the user may change their current running form.

Another aspect of the disclosure may include any combination of the above-mentioned features and may further include the computer being further programmed and configured to analyze data collected from the sensor after a communication to the user through the console that provides instructions on how the user may change their current running form to improve running efficiency, and to compare the data with previously acquired data.

Another aspect of the disclosure may include any combination of the above-mentioned features and may further include the computer being further programmed and configured to communicate a change in running efficiency via the console utilizing the compared data.

In a further aspect of the disclosure, a method of improving running efficiency may comprise measuring power usage of a drive motor of a treadmill while a user is running on the treadmill for a first period of time.

Another aspect of the disclosure may include any combination of the above-mentioned features and may further include analyzing the measured power usage of the drive motor for the first period of time with a computer.

Another aspect of the disclosure may include any combination of the above-mentioned features and may further include providing the user with information about the user's running form based on the analyzed data.

Another aspect of the disclosure may include any combination of the above-mentioned features and may further include providing the user with information on how the user may change their current running form to improve running efficiency.

Another aspect of the disclosure may include any combination of the above-mentioned features and may further include measuring power usage of the drive motor while the user is running on the treadmill for a second period of time after the user is provided with the information on how the user may change their current running form to improve running efficiency.

Another aspect of the disclosure may include any combination of the above-mentioned features and may further include comparing the measured power usage of the drive motor over the first period of time with the measured power usage of the drive motor over the second period of time and evaluating improvement in the user's running efficiency.

Another aspect of the disclosure may include any combination of the above-mentioned features and may further include providing a communication to the user with information on improving foot placement.

Another aspect of the disclosure may include any combination of the above-mentioned features and may further include providing a communication to the user with information on improving posture.

Another aspect of the disclosure may include any combination of the above-mentioned features and may further include providing a communication to the user with information on improving arm swing.

Another aspect of the disclosure may include any combination of the above-mentioned features and may further include providing a communication to the user comprising a calculated running cadence over the first period of time and a target running cadence.

Another aspect of the disclosure may include any combination of the above-mentioned features and may further include communicating a rhythm to the user having a tempo that substantially matches the user's running cadence over the first period of time.

Another aspect of the disclosure may include any combination of the above-mentioned features and may further include incrementally increasing the tempo of the rhythm communicated to the user until the tempo of the rhythm substantially matches the target running cadence.

Another aspect of the disclosure may include any combination of the above-mentioned features and may further include analyzing the measured power usage of the drive motor with the computer by calculating at least one of a running efficiency and a running inefficiency.

Another aspect of the disclosure may include any combination of the above-mentioned features and may further include analyzing the measured power usage of the drive motor with the computer by calculating a total force applied to the treadmill by the user.

In a further aspect of the present disclosure, a method of improving running efficiency may comprise measuring power usage of a drive motor of a treadmill while a user is running on the treadmill for a first period of time and analyzing the measured power usage of the drive motor over the first period of time with a computer to determine the user's average running cadence over the first period of time.

Another aspect of the disclosure may include any combination of the above-mentioned features and may further include providing a rhythm having a tempo substantially matching the user's average running cadence over the first increment of time.

Another aspect of the disclosure may include any combination of the above-mentioned features and may further include incrementally increasing the tempo of the rhythm until the tempo of the rhythm substantially matches a target running cadence.

Another aspect of the disclosure may include any combination of the above-mentioned features and may further include incrementally increasing the tempo of the rhythm may comprise increasing the rhythm in increments of 5 beats per minute.

Another aspect of the disclosure may include any combination of the above-mentioned features and may further include providing the rhythm providing music to the user that is associated with the rhythm.

In another aspect, which may be combined with any of the aspects herein, providing the rhythm may further comprise providing a visual display of the rhythm.

BRIEF DESCRIPTION OF THE DRAWINGS

The accompanying drawings illustrate various embodiments of the present method and system and are a part of the specification. The illustrated embodiments are merely examples of the present system and method and do not limit the scope thereof.

Throughout the drawings, identical reference numbers designate similar, but not necessarily identical, elements.

DETAILED DESCRIPTION

The present disclosure provides a treadmill that can sense the electric load on a drive motor as a person exercises on the treadmill and analyze this data to determine the person's running efficiency, the person's running cadence, and/or the person's running form. Additionally, this data may be analyzed along with data from sensors associated with a platform of the treadmill to provide the forces that the person's feet impart on the treadmill.

Unless specified or limited otherwise, the terms "connected" and "associated with" are used broadly and encompass both direct and indirect connections and associations. Further, these terms are not restricted to mechanical attachments, but also include frictional, adhesive, magnetic and other attachments.

Figure 1:
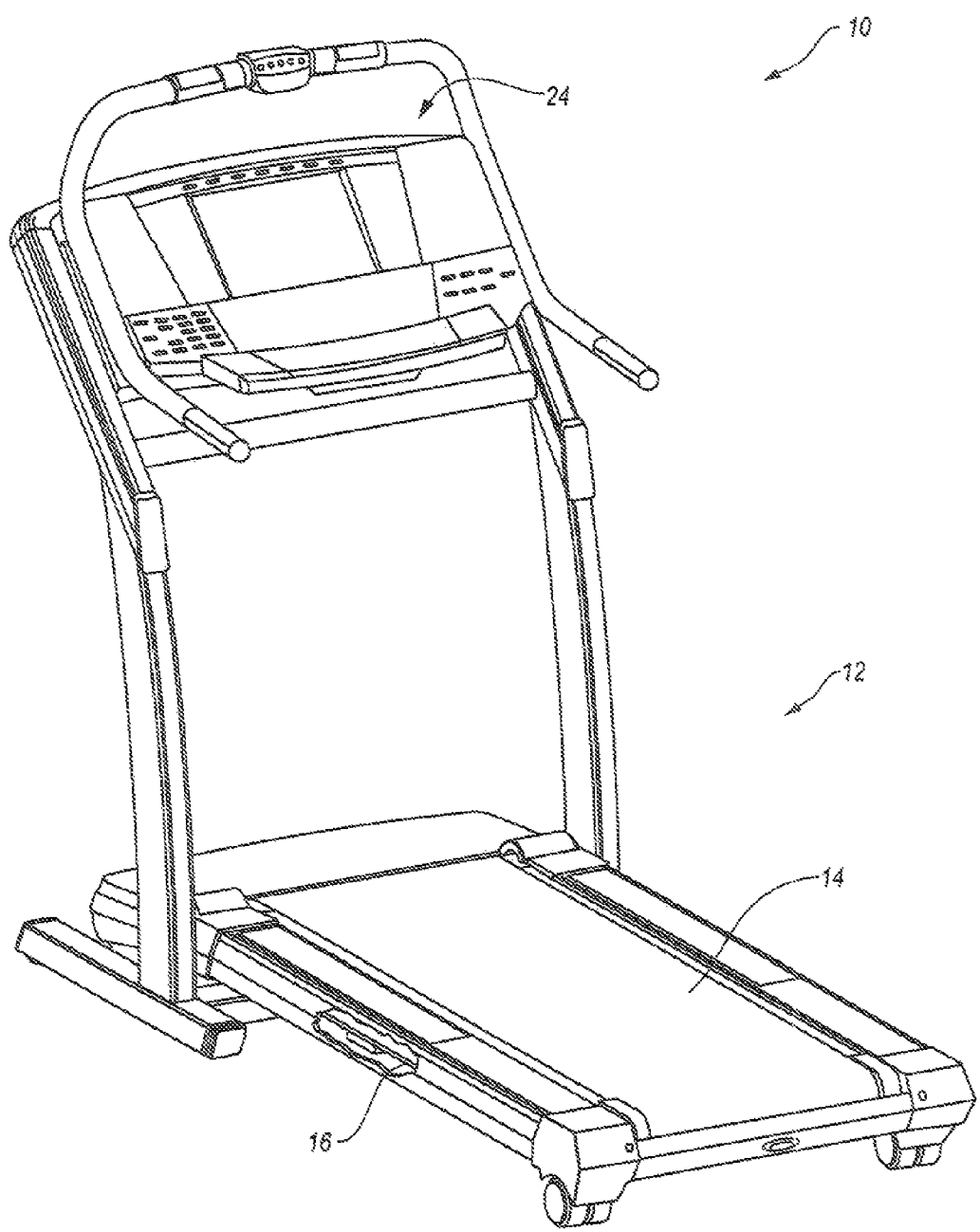
FIG. 1 illustrates a perspective view of a treadmill according to an embodiment of the present disclosure.
Figure 2:
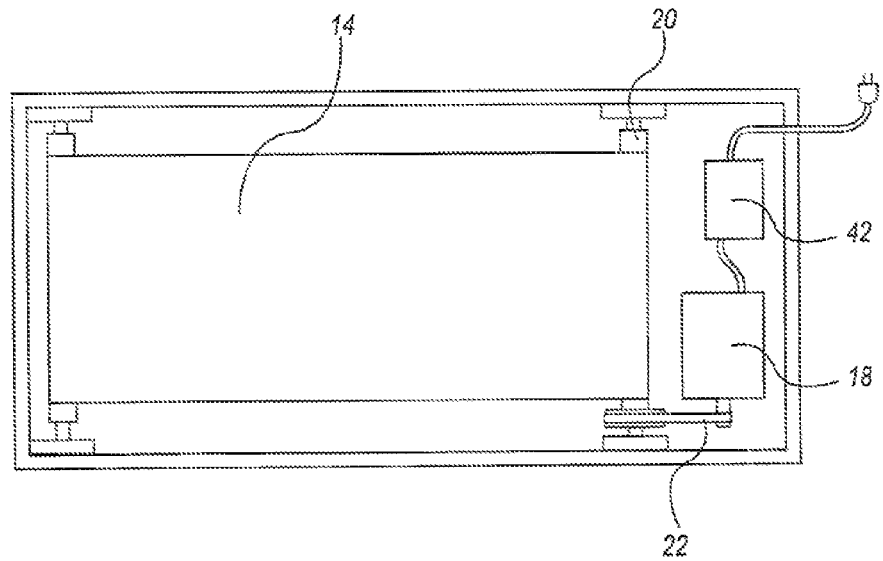
FIG. 2 illustrates a plan view of an interior of a base portion of the treadmill of FIG. 1.

A treadmill according to an embodiment of the present disclosure is illustrated in FIG. 1. As illustrated, a treadmill 10 may include a frame 12, a treadbelt 14 and a deck 16. The frame 12 may comprise various parts of the treadmill 10 and may impart structural stability and/or support to the treadmill 10. The treadbelt 14 is exposed at an upper region of the deck 16, and provides a movable surface upon which a user may walk and/or run. The treadmill 10 may additionally include a drive motor 18 associated with the treadbelt 14, positioned and configured to drive the treadbelt 14, as shown in FIG. 2. For example, the drive motor 18 may be connected to a roller 20 with a belt 22 and the treadbelt 14 may be positioned over the roller 20.

Figure 3:
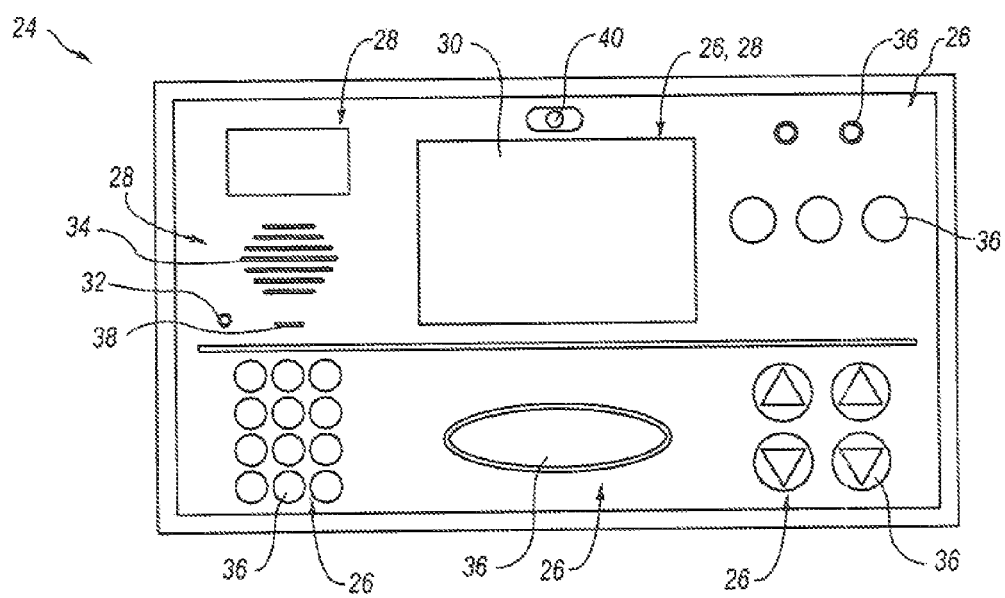
FIG. 3 illustrates a front view of a console of the treadmill of FIG. 1.

Referring again to FIG. 1, the treadmill 10 may also include a console 24. The console 24 may be mounted on the treadmill 10 so that it may be readily accessible and viewable to a user positioned on the treadmill IO. As shown in FIG. 3, the console 24 may include inputs 26 and outputs 28 to allow the user to communicate with the treadmill 10 via the console 24. The console 24 may include a visual display, such as a video screen (e.g., a touch screen 30), to provide visual communications to the user. The console 24 may also include an audio output, such as an audio jack 32 for the connection to headphones that may be worn by a user and/or a speaker 34, to provide audio communications to the user. Input devices may allow a user to input data into the console 24, such as a desired operating speed, a desired incline, information about the user (e.g., a user's weight), and other information. For example, the inputs 26 of the console may include one or more of buttons 36, a touch screen 30, a microphone 38, and a camera 40 for facilitating the input of information.

Figure 4:
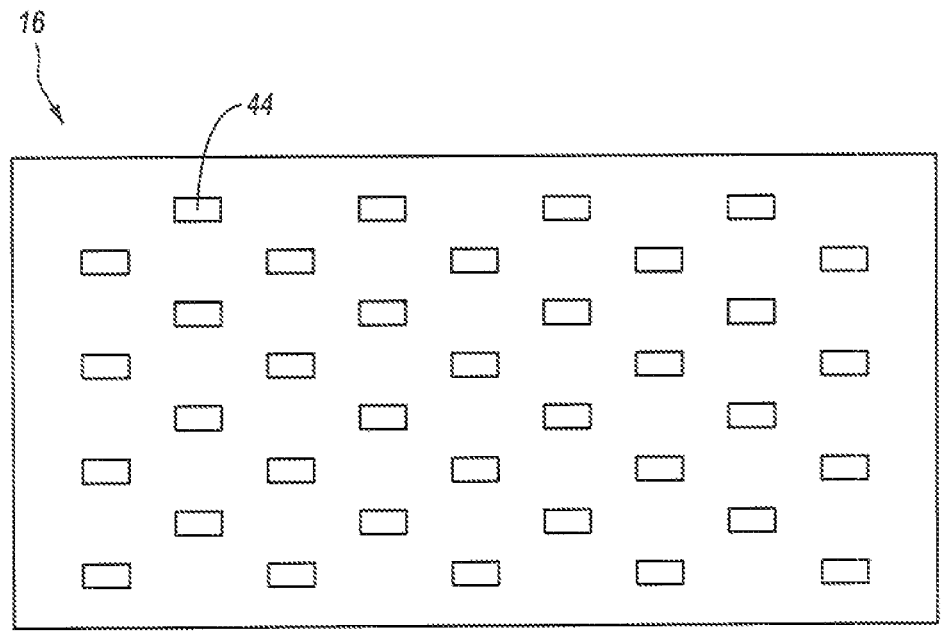
FIG. 4 illustrates a bottom plan view of a deck of the treadmill of FIG. 1.

The treadmill 10 may also include one or more sensors for collecting data while a user is running and/or walking on the treadmill 10. A sensor may be positioned to sense the energy utilized by the drive motor 18. For example, an electrical current sensor 42 may be positioned and configured to sense electrical current utilized by the drive motor 18, as shown in FIG. 2. Similarly, load sensors may be positioned to detect loads on the deck 16. In some embodiments, at least one load cell 44 may be associated with the deck 16 and configured to detect forces acting on the deck 16, as shown in FIG. 4. As a non-limiting example, a load cell 44 may comprise one or more of strain gauges, a hydraulic load cell, a diaphragm load cell, a spool-type load cell, and/or a ring-type load cell.

Figure 5:
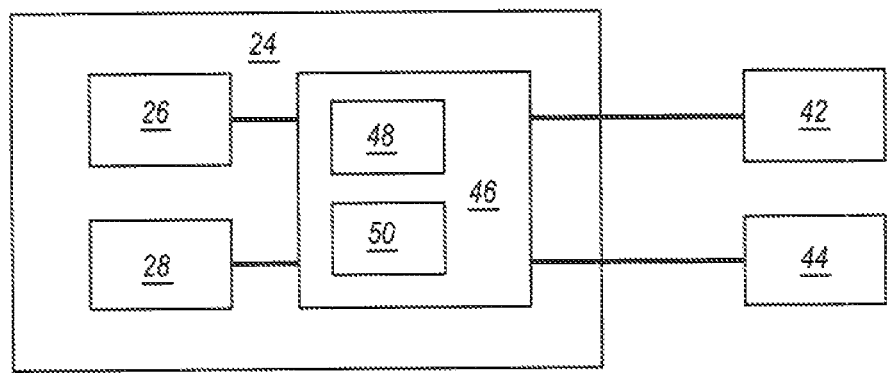
FIG. 5 is a schematic view depicting a computer of the treadmill of FIG. 1.

The console 24 may include a computer 46 located therein, which may include a processor 48 and a memory 50, as illustrated in FIG. 5. In further embodiments, the computer 46 may not be located within the console 24, but may be in communication with the console 24. The computer 46 may be in communication with the inputs 26 and outputs 28 of the console 24 and configured to receive data from the inputs 26 of the console 24. Additionally, the computer 46 may be configured to receive data signals from each sensor of the treadmill 10, such as the electric current sensor 42 and the load cells 44 and to analyze the data with the processor 48. The computer 46 may be programmed to utilize the analysis to modify the settings of the treadmill 10 and to provide specific communications to the user. For example, a program may be provided in the memory 50 of the computer 46.

Figure 6:
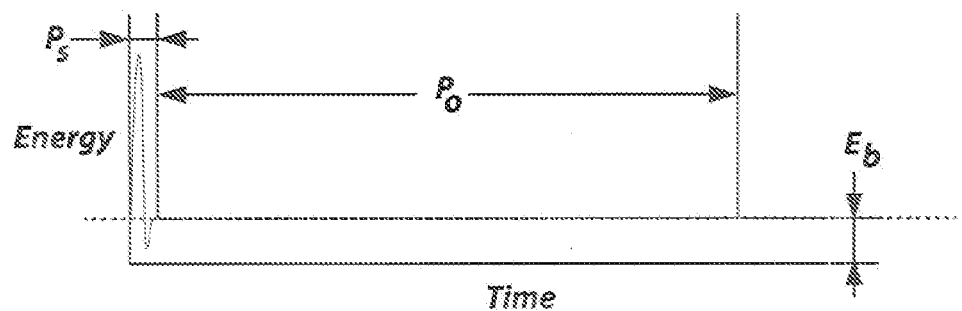
FIG. 6 is a graph illustrating energy usage over time by the drive motor of the treadmill of FIG. 1 while the treadmill is operating without a user running thereon.

In operation, a baseline energy consumption of the drive motor 18 for a specific setting (i.e., a specific speed setting) may be determined. For example, the treadmill 10 may be run at the specific setting and average steady-state energy consumption may be determined by measuring energy consumption with the sensor for a period of operation $P_o$ after a start-up period Ps, as illustrated in FIG. 6. The measured energy consumption over the period of operation $P_o$ may then be averaged by the computer 46 to determine the baseline energy consumption $E_b$ of the drive motor 18 for the specific setting. In further embodiments, the baseline energy consumption for each setting may be programmed into the computer 46. In yet further embodiments, a baseline energy consumption may not be utilized.

Figure 7:
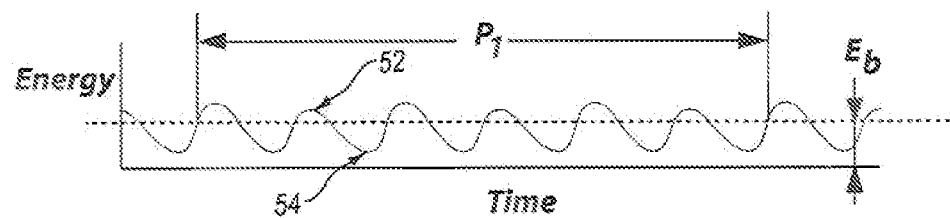
FIG. 7 is a graph illustrating energy usage over time by the drive motor of the treadmill of FIG. 1 while the treadmill is operating with a user running thereon.

A user may then run on the treadmill 10 and the electric current sensor 42 may detect a change in energy usage by the drive motor 18, which may indicate to the computer 46 that the user is running on the treadmill 10. Energy usage data for the drive motor 18 may then be sensed by the electric current sensor 42 over a first period of time $P_1$ and collected by the computer as the user runs on the treadmill, as shown in FIG. 7. The energy usage data from the first period of time $P_1$ may then be analyzed to determine information about the user's running form.

Figure 8:
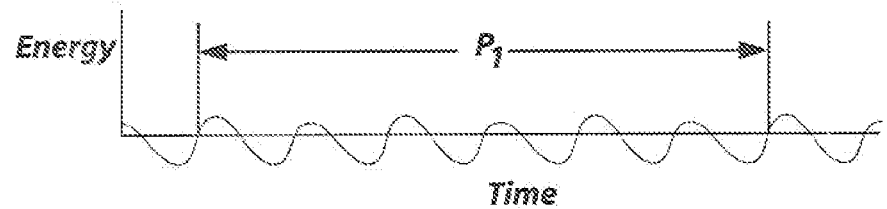
FIG. 8 is a graph illustrating the energy usage of the drive motor depicted in FIG. 7 shifted by a baseline amount.

In some embodiments, the energy usage data from the first period of time $P_1$ may be shifted by the baseline energy consumption $E_b$, as shown in FIG. 8. For example, the baseline energy consumption $E_b$ may be subtracted from the energy usage data from the first period of time $P_1$. After the energy consumption contributed to baseline operation of the treadmill is removed from the data, the data may more accurately reflect the power input into the system via the user as the user is running.

At time increments wherein a user's leading foot impacts the treadbelt 14 of the treadmill 10, a user may exert a force on the treadbelt 14 that opposes the direction of movement of the treadbelt 14, thus, the drive motor 18 may utilize additional energy to maintain the relative speed of the treadbelt 14. At time increments wherein a user pushes against the treadbelt 14 to move the user forward, relative to the treadbelt 14, a force is applied in the direction of movement of the treadbelt 14. Accordingly, the drive motor 18 may utilize less energy to maintain the relative speed of the treadbelt 14 at these times. The more force that is applied by the user opposing the direction of the treadbelt 14, the more energy that will be utilized by the drive motor 18 to maintain the relative speed of the treadbelt 14. Similarly, the more force that is applied by the user in the direction of movement of the treadbelt 14, the less energy will be utilized by the drive motor 18 to maintain the relative speed of the treadbelt 14. When plotted on a graph of energy consumption versus time with the baseline energy consumption $E_b$ subtracted from the energy consumption data, as shown in FIG. 8, the data may show periodic positive and negative energy consumption.

The data for the first period of time $P_1$ may be integrated by the computer 46 to calculate a number that correlates to a user's exerted power while running. For example, a plurality of discrete measurements occurring over the first period of time $P_1$ may be added together by the computer 46 with a summing function. Optionally, after the data has been integrated over the first period of time $P_1$, the calculated integrand may be divided by the number of strides occurring during first period of time $P_1$ by the computer 46 to provide a scaled inefficiency number, which may be communicated to the user via the console 24. The larger the scaled inefficiency number, the greater the inefficiency of the user's running form. Optionally, the scaled inefficiency number may be subtracted from a constant, such as 100, by the computer 46 to provide a scaled efficiency number, which may be communicated to the user via the console 24.

Figure 9:
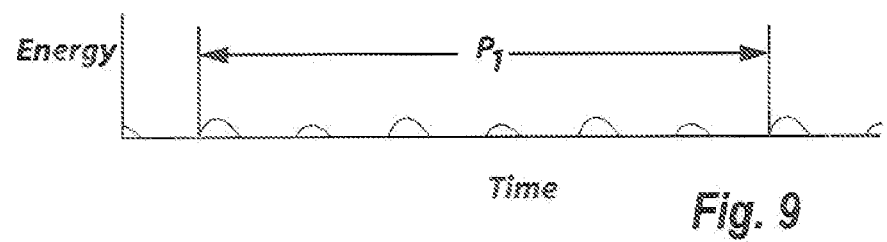
FIG. 9 is a graph illustrating the shifted energy usage of the drive motor depicted in FIG. 8 with negative values removed.

Data that correlates to energy input into the treadmill 10 by a user that opposes the drive motor 18 (e.g., data corresponding to force applied by a user that opposes the motion of the treadbelt 14) may be especially significant in determining inefficient running form. In view of this, in some embodiments, the computer 46 may integrate only a portion of the data, such as the portion of the data that corresponds to energy utilized by the drive motor 18 that exceeds the baseline energy consumption $E_b$ by the drive motor 18. For example, the collected energy data may be shifted by the baseline energy consumption $E_b$ amount, as shown in FIG. 8, and any data that is positive may be integrated by the computer 46, while any data that is negative may be discarded or ignored and not considered in the analysis, as shown in FIG. 9. Optionally, after the data has been integrated over the first period of time $P_1$, the calculated integrand may be divided by the number of strides occurring during first period of time $P_1$ by the computer 46 to provide a scaled inefficiency number, which may be communicated to the user via the console 24. The larger the scaled inefficiency number, the greater the inefficiency of the user's running form. Optionally, the scaled inefficiency number may be subtracted from a constant, such as 100, by the computer 46 to provide a scaled efficiency number, which may be communicated to the user via the console 24. The greater the scaled efficiency number, the greater the efficiency of the user's running form.

Figure 10:
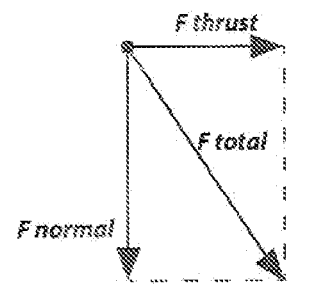
FIG. 10 is a force diagram depicting forces applied to the treadmill of FIG. 1 by a user.

In addition to providing information about the user's running efficiency, the energy consumption data collected by the electric current sensor 42 may also be analyzed to provide additional information about the user's running form. For example, the computer 46 may be programmed to calculate a derivative of the energy consumption data, which may be utilized by the computer 46 to provide a magnitude of a force that the user imparts in a direction parallel to the ground at a particular point in time. In some embodiments, a derivative of the energy consumption data at a specific time may be estimated by calculating the difference between a data point collected at that time and an adjacent data point (e.g., a data point collected at a time before or after). In view of this, at any discrete time during the runner's stride, which corresponds to a discrete foot position at that time, may be analyzed by the computer 46 to determine how much positive or negative force $F_{thrust}$ is generated by the user that contributes to the user's locomotion (i.e., forces that are parallel to the ground or thrust force), as shown in FIG. 10. Additionally, the load sensors associated with the deck may detect the magnitude of the force $F_{normal}$ that the user imparts in a direction perpendicular to the ground (i.e., normal force) at a discrete time during the runner's stride, which may be analyzed to determine how much force $F_{normal}$ the user imparts downward on the ground (e.g., forces that are perpendicular or normal to the ground). In view of this, a force $F_{thrust}$ component that is parallel to the ground and a force $F_{normal}$ component that is perpendicular to the ground at a discrete time may be calculated. Utilizing vector addition, or any other summation techniques, to combine the force $F_{thrust}$ and $F_{normal}$ components, as illustrated in FIG. 10, the computer may be programmed to calculate a total force $F_{total}$ vector, describing both the magnitude and direction of the force $F_{total}$ that the user imparts on the treadmill 10 through their feet at any discrete time or foot position.

The drive motor 18 energy usage data collected by the electric current sensor 42 may also be analyzed to by the computer 46 to determine a user's running cadence. As the energy data will be cyclic, rising and falling with the user's strides, the computer 46 may be programmed to analyze repeating features of the data, which may be indicative of a user's running cadence. For example, the computer may be programmed to analyze the occurrence of peaks 52 and/or valleys 54 in the data, as shown in FIG. 7 and/or may evaluate when the measured data crosses a specific value (e.g., each time a measured data point is substantially equal to the value $E_b$) to evaluate the length of time between each stride and determine a running cadence.

After the computer 46 has analyzed the energy data from the electric current sensor 42, and optionally the data from one or more load cells 44, the computer may be programmed to provide a communication to the user via the console 24 that is specific to the analyzed data to facilitate an improvement in the user's running form. In some embodiments, the computer 46 may be programmed to report at least one of a scaled running inefficiency number and a scaled running efficiency number to the user in response to the analyzed data. Additionally, the computer 46 may be programmed to communicate advice on improving the user's running efficiency via the console 24.

In some embodiments, the computer 46 may instruct the user to change their running form to adjust which part of the foot first impacts the treadbelt 14, specifically to land on the ball of the foot or on the full foot and to avoid striking with the heel. For example, the computer 46 may be programmed to provide proper foot placement instructions in response to an analysis that indicates a relatively high scaled running inefficiency number and/or that indicates relatively high impact forces occurring between the user's foot and the treadmill 10. In some embodiments, the instructions may be communicated in an audiovisual presentation via the console 24. For example, a video may show an example of a runner displaying efficient foot placement and form while running.

In further embodiments, the computer 46 may instruct the user to adjust their posture to improve their running form and their running efficiency after analyzing the data. After the computer 46 provides instructions to the user via the console 24, the user may continue running on the treadmill 10 and additional data may be collected from the electric current sensor 42, and optionally, one or more load cells 44, over a second period of time. The computer 46 may then analyze the data collected over the second period of time. After the data is analyzed, the analysis from the data collected over the second period of time may be compared to the analysis of the data collected over the first period of time $P_1$ (i.e., a time period prior to the computer providing the instructions to the user). The effects of the change to the user's running form may then be calculated by the computer 46 and reported to the user. For example, an improvement in running efficiency may be reported, such as a percentage increase in running efficiency, via the console 24. For another example, a specific reduction of impact force $F_{total}$ and/or $F_{normal}$ between the user's foot and the treadmill may be reported. The process may be repeated as desired by the user to improve the user's running efficiency and to monitor the user's running efficiency, impact forces, and/or cadence as the user runs on the treadmill 10.

INDUSTRIAL APPLICABILITY

In general, the present invention relates to treadmills that include a sensor for detecting the energy used by a drive motor of the treadmill and a console for communicating information about the user's running form based on the analyzed data received from the sensor. For example, running efficiency is important to runners, especially endurance runners, as an improvement in running efficiency may improve running speed and running distance.

Currently, it is difficult for a runner to determine an accurate running efficiency. A runner may evaluate the way that they feel during or after a run, but, factors other than the runner's form may affect the way that the runner feels, such as, weather conditions, diet, sickness and other factors. Accordingly, it may be difficult for a runner to get an accurate assessment of how efficiently they are running, or how a change in their running form is affecting their running efficiency.

The present disclosure provides a treadmill that can sense the electric load on a drive motor as a person exercises on the treadmill and analyze this data to determine the person's running efficiency, the person's running cadence, and/or the person's running form. Additionally, this data may be analyzed along with data from sensors associated with a platform of the treadmill to provide the forces that the person's feet impart on the treadmill. In view of this, the treadmill may provide a runner an accurate assessment of running form factors, such as running efficiency, at home or at a local gym. Additionally, the treadmill may coach the user to improve running efficiency by providing feedback and advice to the user.

The user may input and receive communications through the console, which may interact with the user both visually and aurally. A user may input information about themselves, such as weight, and about their desired workout, such as running speed. Additionally, the console may provide communications to the user with information about their running form and advice on how to improve running form. The console may include a visual display, such as a video screen, to provide visual communications to the user. The console may also include an audio output, such as an audio jack for the connection to headphones that may be worn by a user and/or a speaker, to provide audio communications to the user. The inputs of the console may include one or more of buttons, a touch screen, a microphone, and a camera.

The treadmill may analyze data from sensors with a computer to evaluate the user's running form and utilize this analysis to determine what information to communicate to the user through the console. The sensors may include a sensor positioned to sense the energy utilized by the drive motor, and optionally, load sensors positioned to detect loads on the deck.

In response to the analyzed data, the treadmill may communicate information about the user's running form, such as running efficiency, total impact forces, and running cadence. Additionally, the treadmill may communicate information about how the user may improve their running efficiency, such as by improving foot placement, posture, arm swing, and cadence.

Specifically, the computer may provide instructions to the user to run with their body essentially straight and leaning slightly forward and to avoid bending at the hip or leaning back. The computer may instruct the user to look straight ahead and think of balancing a book on their head, and/or to breath deep to straighten posture and open the lungs before running. Additionally, the computer may instruct the user to utilize minimal, compact arm swings pumping straight forward and back with the arms relaxed and close to the body and the elbows at about 90 degrees. For example, the computer may be programmed to provide instructions for proper running posture in response to an analysis that indicates a relatively high scaled running inefficiency number and/or that indicates relatively high impact forces occurring between the user's foot and the treadmill. In some embodiments, the instructions may be communicated in an audiovisual presentation via the console. For example, a video may show an example of a runner displaying efficient posture while running.

In yet further embodiments, the computer may instruct the user to adjust their running cadence after analyzing the data. Specifically, the computer may provide the user with their current running cadence and provide a target running cadence for the user via the console. For example, the computer may be programmed to provide cadence instructions in response to an analysis that indicates a relatively low running cadence. To facilitate an increase of the user's running cadence over a period of time, the computer may provide a rhythm to the user via the console that has a tempo that corresponds to the users current running cadence. The rhythm may be audible and/or visible, and may also incorporate music, with the music synchronized with the rhythm. The tempo of the rhythm may initially correspond to the user's current running cadence. The tempo of the rhythm may then be incrementally increased (e.g., the tempo of the rhythm may be incrementally increased by 5 beats per minute) while the user is running and the user may try to match their running cadence with the tempo of the rhythm. The tempo of the rhythm may be incrementally increased until the rhythm matches the target running cadence. For example, the tempo of the rhythm may be increased until the tempo of the rhythm matches a target tempo of about 180 beats per minute.

After providing communications to the user advising on how to improve running form and efficiency, the treadmill may analyze their running and determine how much the changes in the user's running form have affected their running efficiency. In view of this, the user may adopt changes in running form that provide improvement to their running efficiency and become a more efficient runner.

What is claimed is:

1. A treadmill comprising:
   a deck;
   a treadbelt covering at least a portion of the deck;
   a drive motor configured for driving the treadbelt;
   an electrical property sensor in communication with the drive motor and configured to detect an amount of power utilized by the drive motor;
   a console configured to convey information to a user;
   a computer comprising a memory and a processor, the computer configured for electric communication with the electrical property sensor and the console, the computer programmed to analyze data received from the electrical property sensor, to provide a communication to a user through the console that provides information about the user's running form based on the analyzed data received from the electrical property sensor, and to provide a communication to the user through the console that provides information on how the user can change their current running form to improve running efficiency.

2. The treadmill of claim 1, wherein the computer is programmed to analyze the signal from the electrical property sensor to determine a user's running cadence.

3. The treadmill of claim 1, wherein the computer is programmed to analyze the signal from the electrical property sensor to determine an impact force when a user's foot impacts the treadbelt.

4. The treadmill of claim 1, wherein the console comprises a video display; and
   wherein the computer is programmed to deliver a video signal to the console to provide video information to the user via the video display that depicts how the user can change their current running form.

5. The treadmill of claim 1, wherein the console comprises a speaker; and
   wherein the computer is programmed to deliver an audio signal to the console to provide audio information to the user via the speaker that describes how the user can change their current running form.

6. The treadmill of claim 1, wherein the computer is further programmed and configured to analyze data collected from the sensor after a communication to the user through the console that provides instructions on how the user can change their current running form to improve running efficiency, and to compare the data with previously acquired data.

7. The treadmill of claim 6, wherein the computer is further programmed and configured to communicate a change in running efficiency via the console utilizing the compared data.

* * * * *